Aug. 28, 1962 R. J. DUFOUR ET AL 3,050,980
METER PROVING MEANS
Filed April 25, 1956 10 Sheets-Sheet 1

INVENTORS:
Raymond J. Dufour
William C. Isley
BY: Brown, Jackson, Boettcher & Dienner
Attys.

Aug. 28, 1962     R. J. DUFOUR ET AL     3,050,980
METER PROVING MEANS Filed April 25, 1956     10 Sheets-Sheet 8

United States Patent Office 3,050,980
Patented Aug. 28, 1962

3,050,980
METER PROVING MEANS
Raymond J. Dufour, Wheaton, Ill. (% Northern Illinois Gas Company, 615 Eastern Ave., Bellwood, Ill.), and William C. Isley, 201 Regent St. Hampton, Va.
Filed Apr. 25, 1956, Ser. No. 580,554
1 Claim. (Cl. 73—3)

This invention relates to meter proving means and has to do with means for proving meters, such as gas meters, which have a rotatory prover hand or equivalent member.

It is a customary practice in proving gas meters to pass a suitable fluid, preferably a gas, conveniently air, in one or more test runs through the meter. It may be assumed that air is used as the testing medium. By way of example, in the State of Illinois, a gas meter is proved by subjecting the same to three successive test runs. In each of the first two test runs air, from an accurately measured quantity of air, is passed through the meter at a check rate of flow which is approximately 20% of the rated full flow capacity of the meter, during one complete rotation of the prover hand. Upon completion of each test run the reading of the meter, allegedly indicating the amount of air which has passed through it, is checked against the remaining amount of the accurately measured quantity of air to determine the degree of accuracy of the meter. In the third test run the air is passed through the meter at a full rate of flow, which is the rated full flow capacity of the meter, during one complete rotation of the prover hand. The reading of the meter is then checked against the remaining amount of the accurately measured quantity of air as before. Under the present practice the various operations entailed in making the test runs are performed manually and it is necessary to read the meter after each run. That is time consuming and renders proving of meters expensive, which is objectionable for obvious reasons.

Our invention is directed to means whereby meters may be proved at comparatively high speed so as to avoid the rather lengthy delays encountered under the present practice above mentioned. The proving means of our invention is capable of automatically performing a complete cycle of test runs comprising the complete proving of a meter, at comparatively high speed and, at the end of each cycle is automatically conditioned for performing a succeeding cycle. We also provide means whereby the speed of rotation of the prover hand of the meter under test may be increased automatically between the test runs of the cycle, thereby materially reducing the time to complete a cycle or proof of the meter. A further important feature of our invention is the provision of means for automatically making a graphic record of the performance of the meter during each test run thereof, so that necessity for reading the meter at the end of each run before starting a succeeding run is eliminated, which effects a further substantial saving in time in proving the meter. An additional feature of our invention of practical importance is the provision of means for testing the meter for leakage thereof preliminary to starting the first test run of the cycle and without appreciably delaying performance of the cycle. A further important feature of our invention resides in the provision of means for selectively coupling valves controlling the rate of flow of air through meters being proved whereby but a comparatively small number of valves is required for proving meters of various types. Further objects and advantages of our invention will appear from the detail description.

Figure 1:
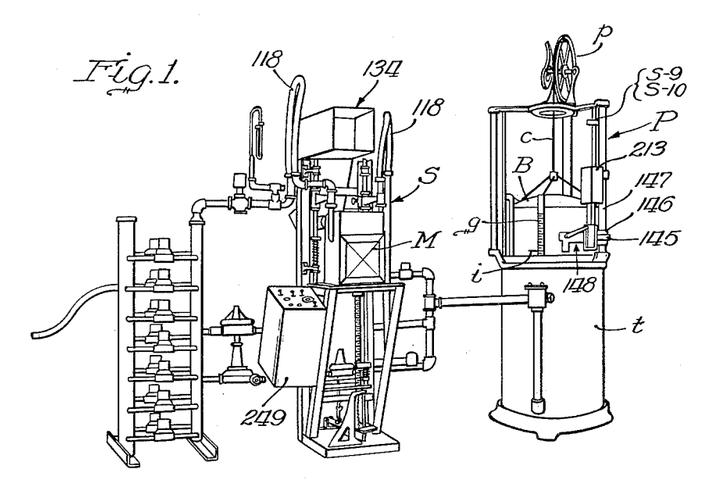
FIGURE 1 is a perspective view of meter proving apparatus embodying our invention.

The meter proving means of our invention comprises a prover P (FIG. 1) of known type, having a bell B suspended for vertical movement by means of a cable c passed over a pulley p and connected at its free end to a system of counterweights (not shown). A suitably calibrated gauge g is mounted on bell B for movement therewith for indicating, in cooperation with an index member or pointer i, mounted on tank t of prover P, the height of bell B and the quantity of air contained therein. A meter stand S is spaced an appropriate distance from prover P for supporting a meter to be proved. The stand S is, in general, of known type except that it is provided with an adjustable meter supporting platform 100 for supporting a meter M to be tested. The platform 100 is fixed upon the upper ends of two vertical rods 101 slidable through the fixed table plate 102 of stand S. The lower ends of rods 101 are secured in the ends of a horizontal cross bar 103 through the center of which is threaded a vertical screw shaft 104 rotatably supported at its upper end and restrained against endwise movement, by means of anti-friction bearings 105 in cooperation with a bracket 106 fixed to plate 102 at the under face thereof. The lower end of screw shaft 104 extends into a speed reduction unit 107 by means of which shaft 104 is driven from a reversible electric motor 108 mounted on stand S and controlled by a reversing switch (not shown) suitably located on or adjacent stand S.

Two vertical connector rods 110, adjacent the back and the sides of stand S, are slidably mounted through sleeves 111 at the forward ends of arms 112 fixed to stand S at the back thereof. The rods 110 normally are held raised by compression springs 113 mounted thereon and confined between sleeves 112 and collars 114 fixed on rods 110. Connector arms 115 are secured on rods 110 adjacent the upper ends thereof, and are provided with lengthwise slots 116 which received connector fittings 117 adjustably secured therein by clamp nuts threaded on fittings 117. The fittings 117 are attached to the ends of flexible conduits 118 included in a system of conduits, to be referred to more fully later. The arms 115 preferably are secured on rods 110 by means, such as set screws, such that they may readily be adjusted about rods 110. That, in conjunction with the slotted arms 115, provides means whereby the fittings 117 may be adjusted about the rods 110 and toward and away from each other, so as to be accurately aligned with the inlet and the outlet nipples of a meter to be proved mounted on the platform 100.

The connector rods 110, at their lower portions, pass through a channel cross bar 120 to the center of which is secured a pull rod 121 provided at its lower end with an eye which engages through a clevis 122 pivoted to a foot lever 123 pivoted at its rearward end, at 124, on a bracket 125 secured to an angle cross member 126 which is secured to the back of stand S adjacent the bottom thereof. The lever 123 extends forwardly through a slotted plate 127 mounted at the front of stand S and carrying a ratchet bar 128. A foot plate 129 is secured to the top edge of lever 123, at the front thereof, and is disposed for engagement with ratchet bar 128 for retaining the lever 123 in depressed position. A compression spring 130 is mounted about each of the connector rods 110 and is confined between the channel cross bar 120 and an abutment member 131 secured on the lower end of rod 110. When the meter M has been properly positioned upon the platform 100 and the connector fittings 117 have been accurately aligned with the inlet and outlet nipples of the meter, the lever 123 is depressed and latched in depressed position, thus seating the fittings 117 upon the nipples of the meter under yielding pressure and thereby connecting the meter to be proved into the proving means or apparatus.

Figures 2, 3:
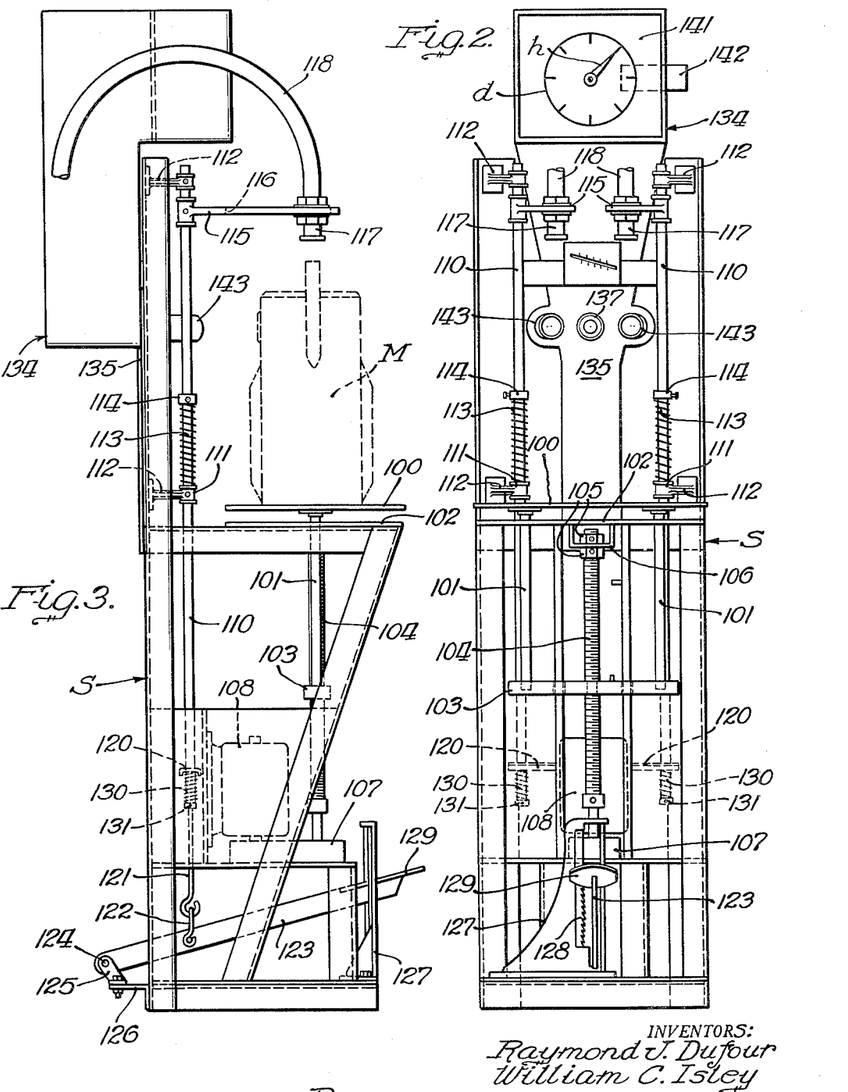
FIGURE 2 is a front view of a meter stand and optical means associated therewith for producing an enlarged image of the prover hand of a meter passing over a photocell tube, used in the apparatus of FIGURE 1.
FIGURE 3 is a side view of the stand and associated parts of FIGURE 2, with a meter to be proved indicated in broken lines as mounted on the stand.
Figure 4:
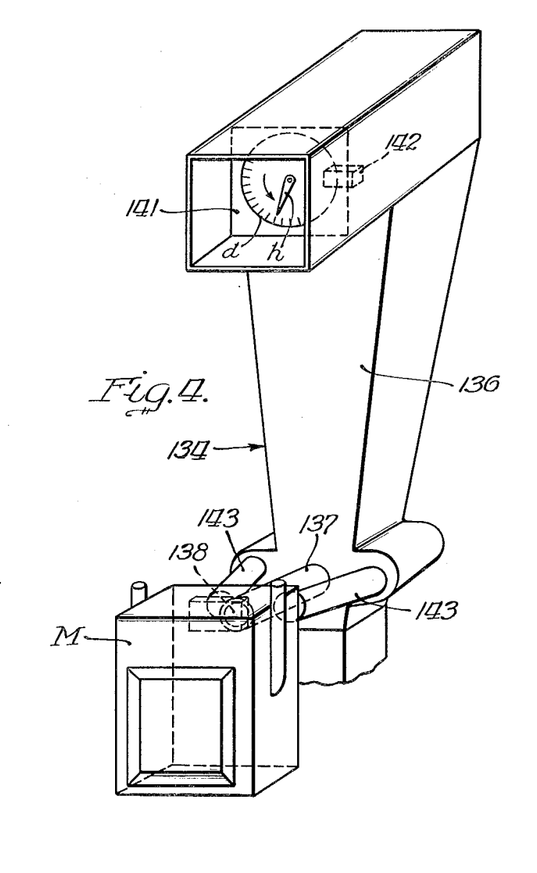
FIGURE 4 is a perspective view, on an enlarged scale, of the optical means of FIGURES 2 and 3 with a meter disposed in cooperating relation thereto, showing the enlarged image of the prover dial and hand of the meter and the photocell tube and the lights for illuminating the meter dial and hand.
Figure 5:
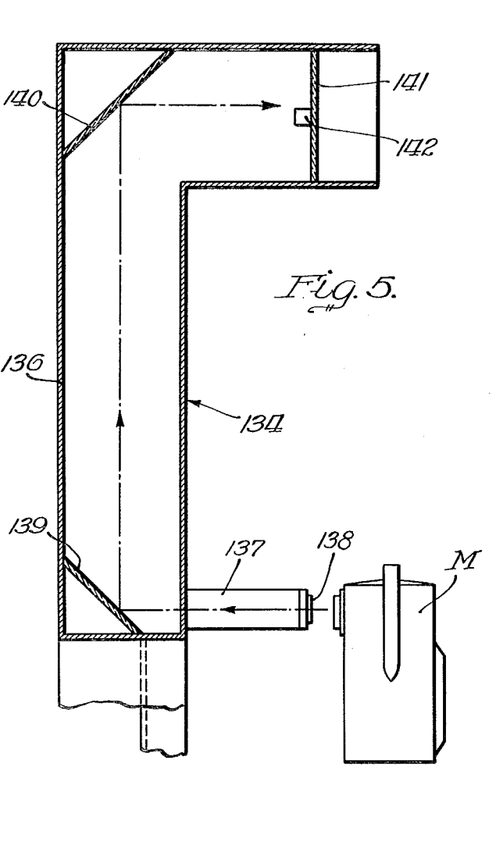
FIGURE 5 is a side view of the parts shown in FIGURE 4, with the optical means shown partly in section and partly broken away and in elevation.

An optical system 134 is mounted, by means of a plate 135, at the back of stand S a suitable distance above the table plate 102. The system 134 comprises a box-like housing 136 of approximately inverted L shape the body portion of which flares upward. A tube 137 opens into the lower end of housing 136 and extends forwardly therefrom, this tube carrying at its forward end a magnifying lens 138. The tube 137 is aligned with a mirror 139 in the lower end of housing 136 inclined at an angle of 45°, and a second mirror 140 is mounted in the upper end or head of housing 136 and is inclined oppositely to mirror 139 at an angle of 45°. A ground glass plate or screen 141 is mounted in the head of housing 136 a short distance from the forward end thereof. A photocell tube 142 is mounted within housing 136 at the inner face and adjacent one side of screen 141. The photocell tube 142 is included in a photocell control circuit to be referred to later in connection with the circuit diagram of the apparatus. Two lights 143 are mounted at opposite sides of the lens tube 137 for illuminating the prover dial and hand of a meter under proof. The meter M is provided with registration means, frequently termed an index, including a prover dial and a prover hand movable over the dial. The latter is white and the hand is black, in accordance with the usual practice. The light reflectance of the prover hand is much less than that of the dial, as will be understood. In practice, the meter is so adjusted on the stand S that the prover dial and hand thereof are accurately aligned with the lens 138, the lights 143 being focused upon the prover dial and hand. A greatly enlarged image of the prover dial and hand is then reflected upon the screen 141 above the stand S in position to be readily observed by the operator. In proving the meter the prover hand thereof revolves over the prover dial and the enlarged image $h$ of the hand also revolves over the enlarged image $d$ of the dial shown on the screen 141, as will be clear from FIGURES 2 and 4. The image of the hand $h$ is of materially less light intensity than the image of the dial $d$ and may be considered as a shadow effective for materially reducing the light intensity of the corresponding area of the dial image. As the image $h$ of the prover hand passes over the image $d$ of the dial it also passes over the photocell tube 142, which causes deenergization of the photocell control circuit, as and for a purpose which will be explained more fully in connection with the circuit diagram.

A horizontally disposed supporting bar 145 is secured to a split bracket 146 which is clamped upon a post or upright 147 of the prover P above the body or tank $t$ thereof. An automatic recorder 148 is mounted upon the bar 145. The recorder 148 comprises a main supporting plate 149 of approximately L shape secured to bar 145 and spaced forwardly therefrom by means of securing screws 150 and associated spacers 151 and 152 and nuts 153 and 154. A carriage 155 is slidably mounted on plate 149 for movement lengthwise thereof. The carriage 155 comprises a back plate 156, a front plate 157 and spacers 158 therebetween of approximately the same thickness as the supporting plate 149. The plates 156 and 157 and spacers 158 are secured together about plate 149 in a suitable manner, conveniently by screws (not shown) passing through plate 157 and spacers 158 threading into plate 156. The plates 156 and 157 and spacers 158 of carriage 155 are secured together below the supporting plate 149 by elongated screws 159 passing therethrough. The screws 159 also pass through a ratchet plate 160 spaced rearwardly from carriage 155 by spacers 161 mounted on screws 159, the latter receiving securing nuts 162 seating on the rear face of ratchet plate 160, the latter being thus mounted upon carriage 155 in parallel spaced relation thereto for a purpose to be explained presently.

Figure 10:
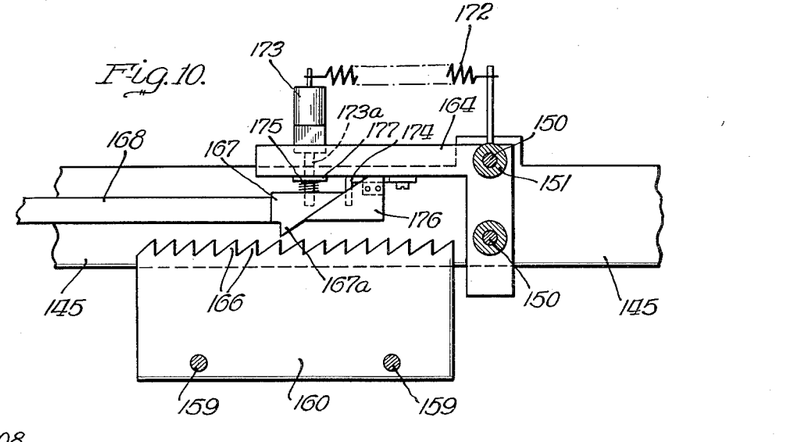
FIGURE 10 is a fragmentary detail view, on an enlarged scale, of the ratchet means for advancing the recording card carriage.
Figure 11:
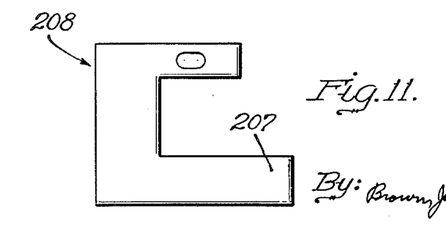
FIGURE 11 is a plan view, on an enlarged scale, of the recorder operating member mounted on the prover bell.

The ratchet plate 160 underlies the space between two spaced guide plates 164 and 165 mounted upon the screws 150 and spaced from each other and from the supporting bar 145 by the spacers 152 and the nuts 153. The ratchet plate 160 is provided at its upper edge with ratchet teeth 166 inclined toward the bracket 146. The guide plates 164 and 165 overlie the approximately V-shaped head 167 of a pawl 168 pivoted at its outer end, at 169, to the inner end of plunger 170 of a solenoid 171 mounted on the back of the mounting plate 149 adjacent the outer end thereof. The pawl 168 normally is held in its inner position, holding plunger 170 of solenoid 171 projected, by a tension spring 172 anchored at one end to spacer 152, which is fixed on screw 150, and at its other end to a weight member 173 having a flattened lower portion slidable between the guide plates 164 and 165 and a reduced downwardly extending stud 173a secured in and extending upwardly from head 167 of pawl 168. A cross member or stop 174, secured between the guide plates 164 and 165, is disposed to be contacted by head 167 for limiting inward movement of the pawl 168. A compression spring 175 is mounted on stud 173a and confined between a washer 177, also mounted on stud 173a and seating against the lower edges of plates 164 and 165, and head 167 of pawl 168. Spring 175 in cooperation with member 173 urges head 167 downward for engagement of detent 167a thereof with teeth 166 of the ratchet plate 160. When the pawl 168 is moved to its inward position by the tension spring 172, the inclined face of head 167 of pawl 168 moves upwardly along a similarly inclined face of a triangular guide member 176 mounted between the guide plates 164 and 165. The head 167 of pawl 168 is thus raised into its inoperative position with detent 167a clear of the teeth 166 of the ratchet plate 160, as shown in FIGURE 10, in which position it normally is held by the tension spring 172. When the solenoid 171 is energized plunger 170 thereof is retracted moving the pawl 168 outward so that head 167 thereof moves downward along the inclined face of guide 176 until detent 167a engages a tooth of the ratchet plate 160, which is then moved outward the distance of one tooth, or one step, in the continued outward movement of pawl 168, which is then returned to its inner inoperative position, upon deenergization of the solenoid 171, by the tension spring 172.

Figure 6:
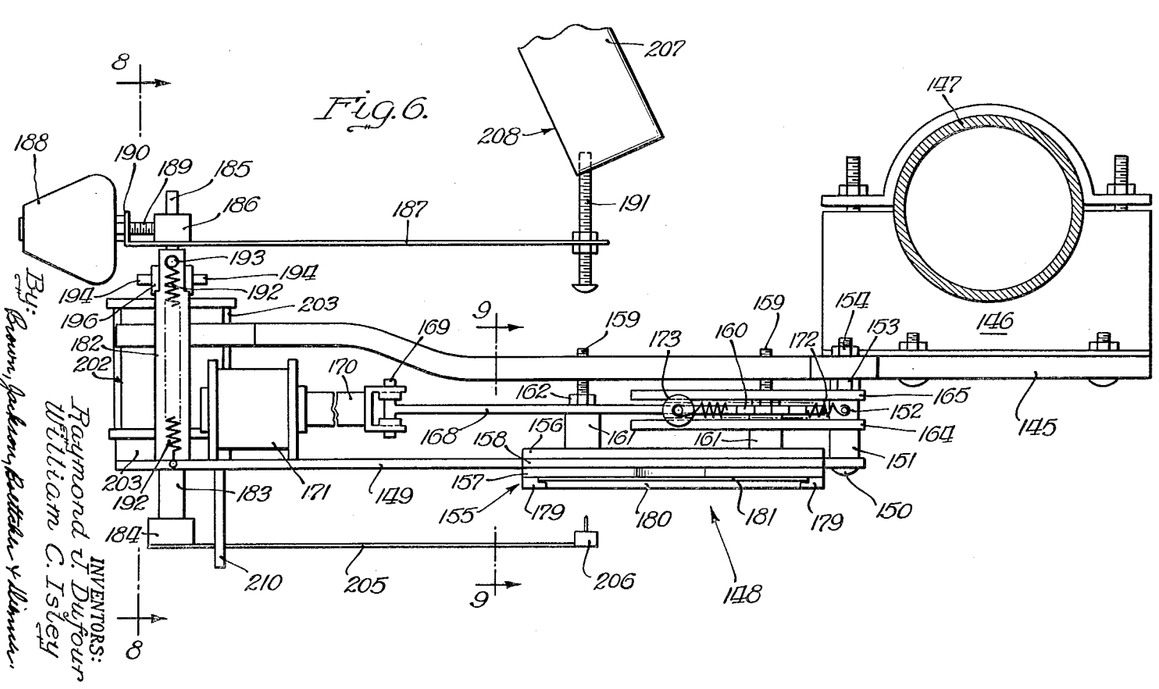
FIGURE 6 is a plan view, on an enlarged scale, of the automatic recording means of the apparatus of our invention mounted on one of the uprights of the prover.
Figure 7:
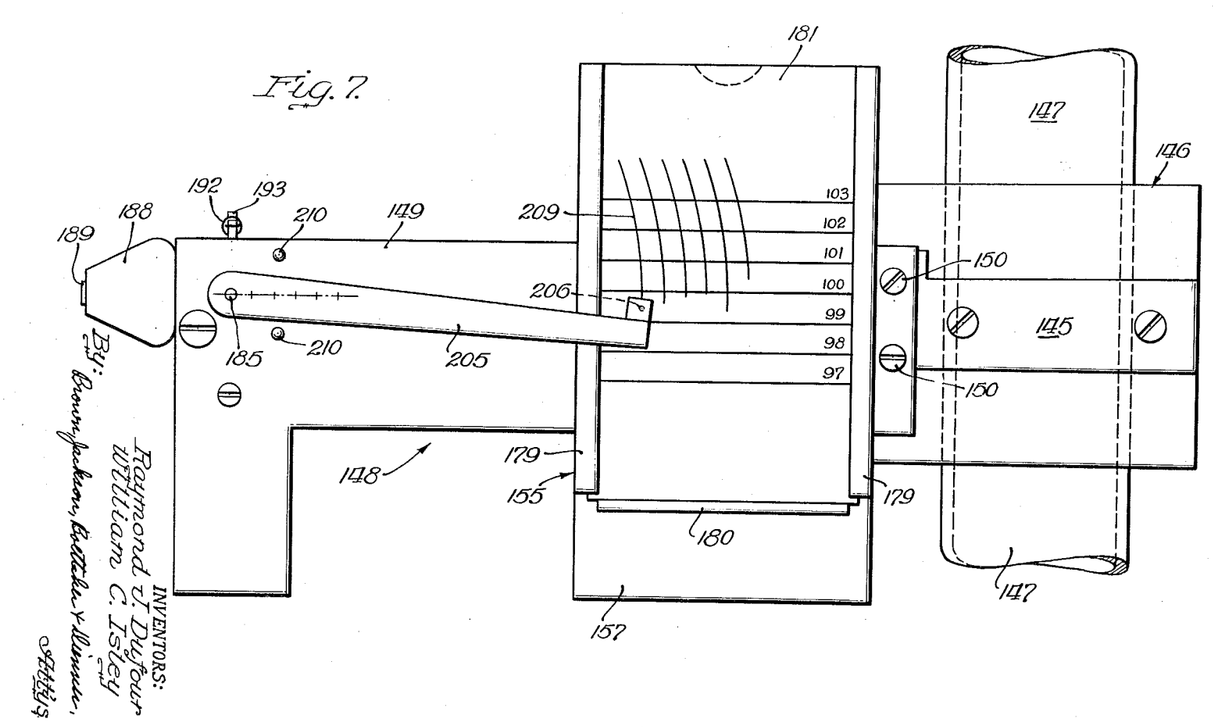
FIGURE 7 is a front view of the automatic recording means of FIGURE 6.
Figure 8:
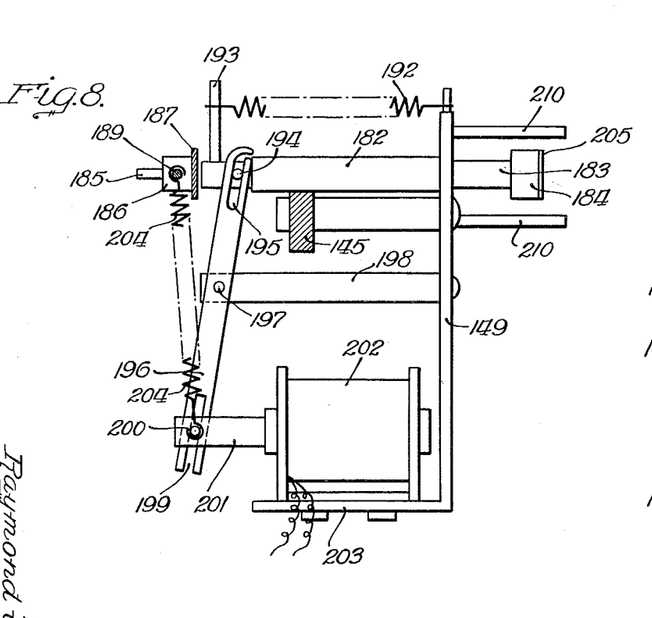
FIGURE 8 is a sectional view taken substantially on line 8—8 of FIGURE 6.
Figure 9:
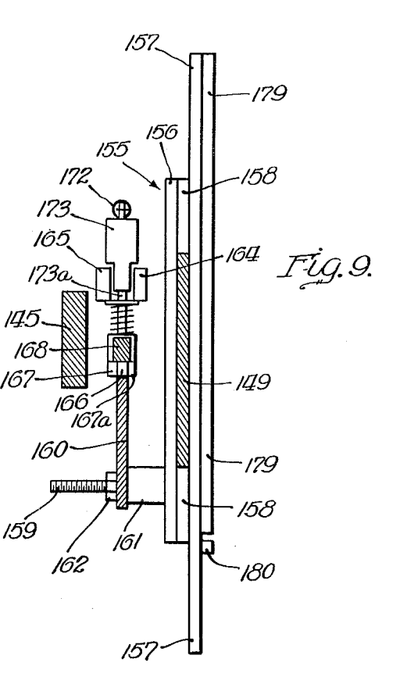
FIGURE 9 is a sectional view taken substantially on line 9—9 of FIGURE 6.

Plate 157 of the carriage 155 is of rectangular shape, as shown more clearly in FIGURE 7, and has secured to its outer face, at each side thereof, a rabbeted strip 179, and, at the lower ends of the strips 179 a cross bar 180 which, together with the strips 179 and the plate 157, provide a holder for a record card 181 to be referred to more fully later. A sleeve 182 is secured to plate 149 adjacent the upper outer corner thereof and extends rearwardly therefrom. This sleeve slidably receives a tube 183 which is held against turning movement relative to sleeve 182 and is provided at its outer end with an enlarged head 184. A rod 185 is rotatably mounted through sleeve 183 and has fixed on its rearward end portion hub 186 of an operating arm 187. A counterweight 188 is adjustably mounted on a screw stem 189 secured in hub 186 and passing through a rearwardly extending finger 190 at the outer end of arm 187. An adjustable abutment member, conveniently a screw 191, is secured through the inner end of the operating arm 187, for a purpose to be explained later. The tube 183 normally is held in its projected forward position shown in FIGURE 6 by a tension spring 192 anchored at its forward end to plate 149 and at its rearward end to a pin 193 secured to and extending upwardly from sleeve 183 adjacent the inner or rearward end thereof. Two pins 194, secured to tube 183 at opposite sides thereof, extend through slots 195 in the upper ends of the arms of a fork 196 pivoted at its mid-length, at 197, on a bracket 198 secured to and extending rearwardly from the mounting plate 149. The arms of fork 196 are provided at their lower ends with slots 199 which receive pins 200 secured in and extending from the opposite sides of plunger 201 of a solenoid 202 mounted on a rearward extension 203 of plate 149 at the bottom of the outer end thereof. A tension spring 204, anchored at its lower end to one of the pins 200 and at its upper end to the screw stem 189, normally holds the fork 196 in its position shown in FIGURE 8, with the plunger 201 of the solenoid 202 in its projected position. When fork 196 is in that position it contacts the inner end of sleeve 182 and in cooperation therewith and with the pins 194 limits outward or forward movement of tube 183. A pen or stylus arm 205, secured upon the outer end of rod 185, is then spaced outwardly from the carriage 155, as shown in FIGURE 6. The arm 205 carries, at its inner end, a stylus 206 of suitable known type which, upon inward or rearward movement of arm 205, is brought into cooperative relation to the card 181 mounted in the carriage, it being understood that the arm 205 is of such length that the inner end portion thereof overlies the card 181 in the innermost position of carriage 155. When the solenoid 202 is energized plunger 201 thereof is retracted and the stylus arm 205 is moved inward or rearward into cooperating relation to the card 181, and arm 187 is also moved rearward positioning the abutment member 191 in the path of downward travel of arm 207 of a substantially U-shaped abutment member 208 adjustably mounted on the top of bell B of the prover. In the continued downward movement of the bell B the operating arm 187 is swung downward in clockwise direction as viewed in FIGURE 7, thereby also swinging the stylus arm 205 in the same direction and, by means of the stylus 206, drawing an arcuate line 209 on the record card 181. The swinging movement of the stylus arm 205 in either direction is limited by stop pins 210 secured in and projecting forwardly from the mounting plate 149 at appropriate distances above and below stylus arm 205. At the same time that the solenoid 202 is energized the solenoid 171 is also energized so as to move the card carriage 155 one step or space outward thus assuring that an unmarked area of card 181 will be available for receiving an arcuate line 209 marked thereon by the stylus.

Figure 12:
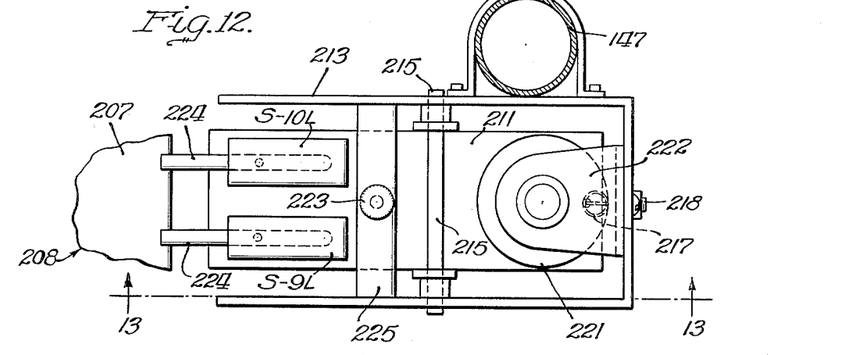
FIGURE 12 is a plan view, on an enlarged scale, of the housing and the lower pair of micro switches therein, mounted on an upright of the prover.
Figure 13:
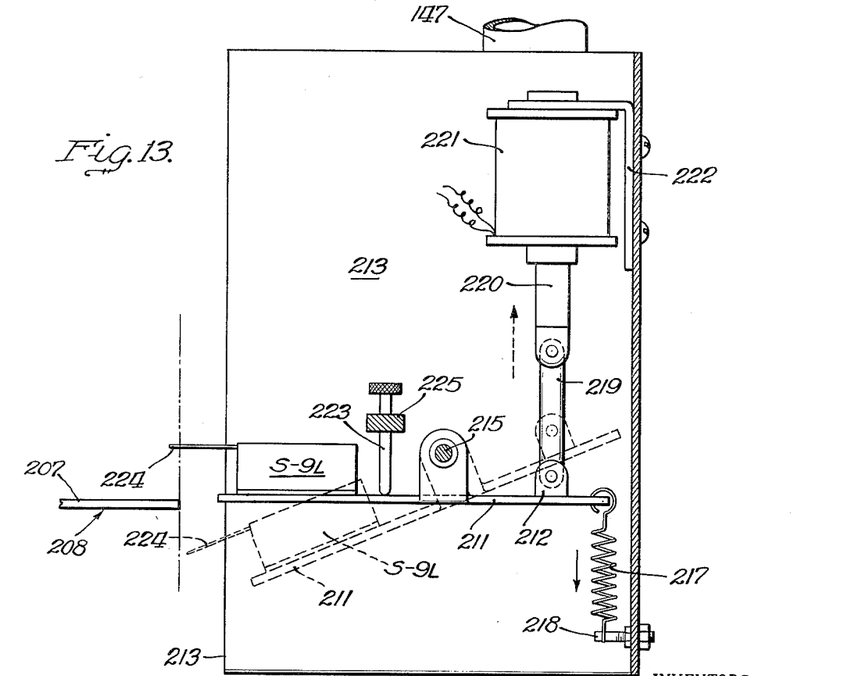
FIGURE 13 is a sectional view taken substantially on line 13—13 of FIGURE 12.

Referring to FIGURES 12 and 13, a sheet metal housing 213 of substantially U shape in plane is mounted on post 147 of the prover P above the supporting bar 145. A pair of micro switches S–9L and S–10L are mounted on a platform 211 pivoted intermediate its ends on a pivot rod 215 secured in the sides of housing 213. A tension spring 217 is anchored at its upper end to the outer end of platform 211 and is anchored at its lower end, at 218, to the outer wall of housing 213. A slotted boss 212 extends upwardly from platform 211 adjacent the outer end thereof and is connected by a link 219, to the lower end of plunger 220 of a solenoid 221 mounted above the platform 211 on a bracket 222 secured to the outer wall of housing 213. Normally the solenoid 221 is de-energized and the tension spring 217 holds the micro switches S–9L and S–10L in operative position as indicated in solid lines in FIGURE 13, the operative location of platform 211 and the switches being determined by an adjustable stop 223 carried by a cross bar 225 secured in housing 213. In that position of the micro switches the arms 224 thereof extend inwardly toward bell B of the prover in overlying relation to arm 207 of the abutment member 208 mounted on the bell. As the bell is filled with air it moves upward and at a predetermined point in the upward travel of the bell, arm 207 of the member 208 contacts the arms 224 of the micro switches S–9L and S–10L so as to close them in succession. At that time the bell has been overfilled with air and closing of the micro switches effects bleeding of air from the bell which then moves downward until both of the micro switches open, at which time downward travel of the bell stops and the bell then contains the proper amount of air for performing a test run of a meter being proved, as will be explained more fully later in connection with the circuit diagram. When the solenoid 221 is energized the plunger 220 is retracted and the micro switches S–9L and S–10L, with platform 211, are turned counterclockwise into their inoperative position shown in dotted lines in FIGURE 13, wherein the switch arms 224 are disposed outside the path of movement of the member 208 to permit the bell to rise above the position just described. A second pair of micro switches S–9 and S–10 is mounted upon the post 147 a substantial distance above the first pair of switches, the second pair of switches being fixed in operative position with the switch arms thereof overlying the arm 207 of the abutment member 208. The second pair of micro switches is used for proving meters which require a substantially larger amount of air than meters which are proved when using the first or lower pair of micro switches, as will appear more fully later.

Figure 14:
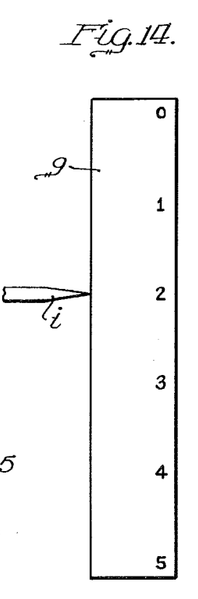
FIGURE 14 is a front view, on an enlarged scale, of the gauge on the prover bell and the index point, the latter being shown fragmentarily.

The gauge g bears a scale graduated in cubic feet and tenths of cubic feet of air in the bell B of the prover, and is attached to the bell for movement therewith. Referring to FIGURE 14, it will be noted that the graduations of the gauge g increase in value downward, starting with zero at the top of the scale, the zero mark being referred to hereinafter as the proof mark. When using the lower pair of micro switches S–9L and S–10L, with the bell B of prover P in its lower position with the index point i at the proof mark, air is admitted to the bell which continues to rise normally until it reaches a position a short distance above the 2 foot mark on the gauge, there being then slightly more than two cubic feet of air within the bell. When the bell reaches that point, the lower pair of micro switches are closed, air is bled from the bell until it is lowered to the two foot mark, at which point both of the micro switches are open and the bell is stopped. The bell then contains air in proper amount for making a check run of a meter under proof. It is to be noted that the bell, when in the zero position on the gauge, contains a small amount of air, approximately 3/10 of a cubic foot, so that when the bell is at the two foot mark on the gauge it contains approximately two and three-tenths cubic feet of air. Thus, with the bell adjusted as stated, over two cubic feet of air is available to be passed from the bell through the meter during that number of complete revolutions of the prover hand required to indicate two cubic feet according to the meter. If the meter is 100% efficient, two cubic feet of air will be passed therethrough in the predetermined number of revolutions of the prover hand, but if the meter is not absolutely accurate, a greater or lesser amount of air will be passed. In that connection, it will be noted that the record or proof card 181 bears a scale increasing in upward direction from a line marked "100" and decreasing downward from that line. As the bell moves downward arm 207 of member 208 contacts the abutment member 191, after the stylus arm 205 has been moved rearward into cooperative relation to card 181 in the manner above described. In the continued descent of the bell the stylus 206 draws an arcuate line 209 upon the card 181. The extent of such continued descent of bell B is governed by the rate or speed of revolution of the prover hand, and when that hand has completed its predetermined number of revolutions, descent of the bell is stopped. Accordingly, the lowermost point of the line 209 drawn upon the card 181 indicates the percentage of efficiency of the meter on proof in respect to the amount of air passed through the meter during either one revolution of the prover hand or a predetermined number of complete revolutions of the prover hand as the case may be, as will be explained more fully later. When proving meters requiring more than two cubic feet of air, the solenoid 221 is energized and the lower pair of micro switches S–9L and S–10L are moved to inoperative position. The bell B of the prover P then rises to a point slightly above the five foot mark on the gauge g, at which point the upper pair of micro switches are closed and the bell is bled back to the five foot mark and stopped there, after which more than 5 cubic feet of air is available to be passed from the bell through the meter during a test run in the same manner as before.

Figure 15:
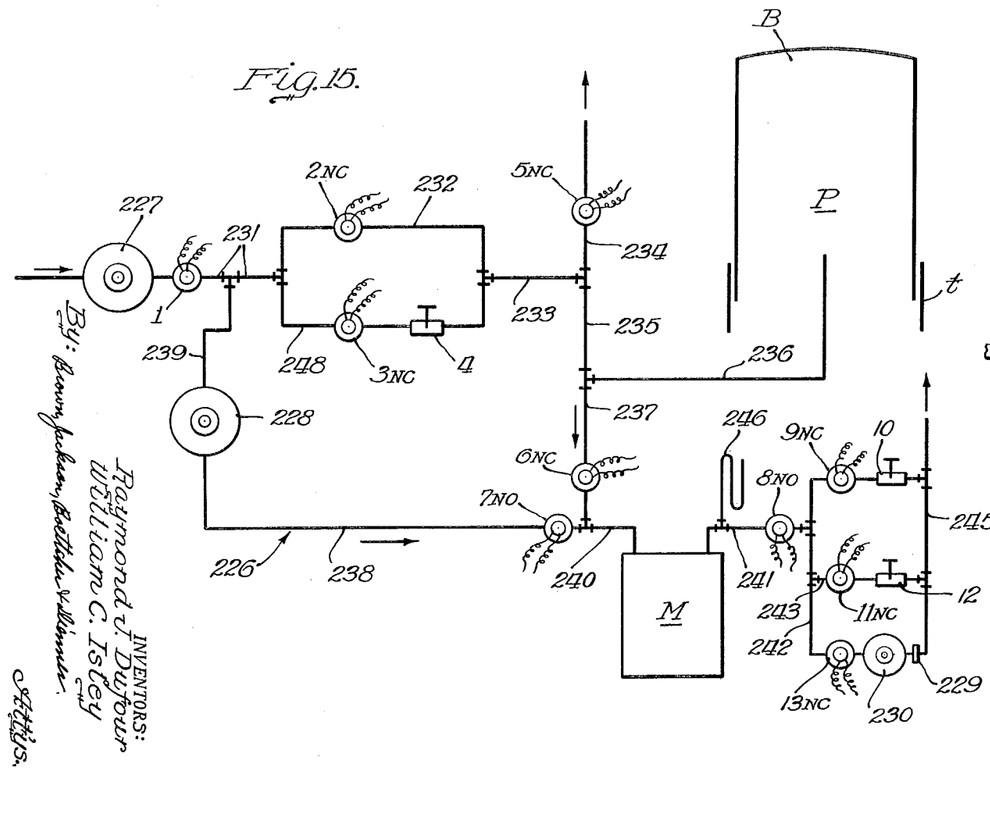
FIGURE 15 is a schematic view of the piping system and associated valves and prover of the apparatus of our invention as used for proving a meter.

In the schematic view of FIGURE 15 we have shown a conduit or piping system 226 to which compressed air is supplied from a suitable source through a high pressure regulator 227. A low pressure regulator 228 is included in the piping system 226 and, like the regulator 227, is of any suitable known type. The piping system includes a plurality of solenoid valves certain of which are normally closed as indicated by the notation "NC" and others of which are normally open as indicated by the notation "NO." The solenoid valves are numbered the same as in the circuit diagram and the piping system includes also a manually operated throttling valve 4 connected in series with the solenoid valve 3, a manually operated throttling valve 10 connected in series with the solenoid valve 9, a manually operated throttling valve 12 connected in series with the solenoid valve 11, and a fixed orifice 229 and a low pressure regulator 230 connected in series with the solenoid valve 13. The pressure regulator 227 is a high pressure regulator and the pressure regulators 228 and 230 are low pressure regulators, the regulator 228 conveniently regulating the air pressure to approximately 2″ water column and the regulator 230 regulating the air pressure to a lower value.

Figure 16:
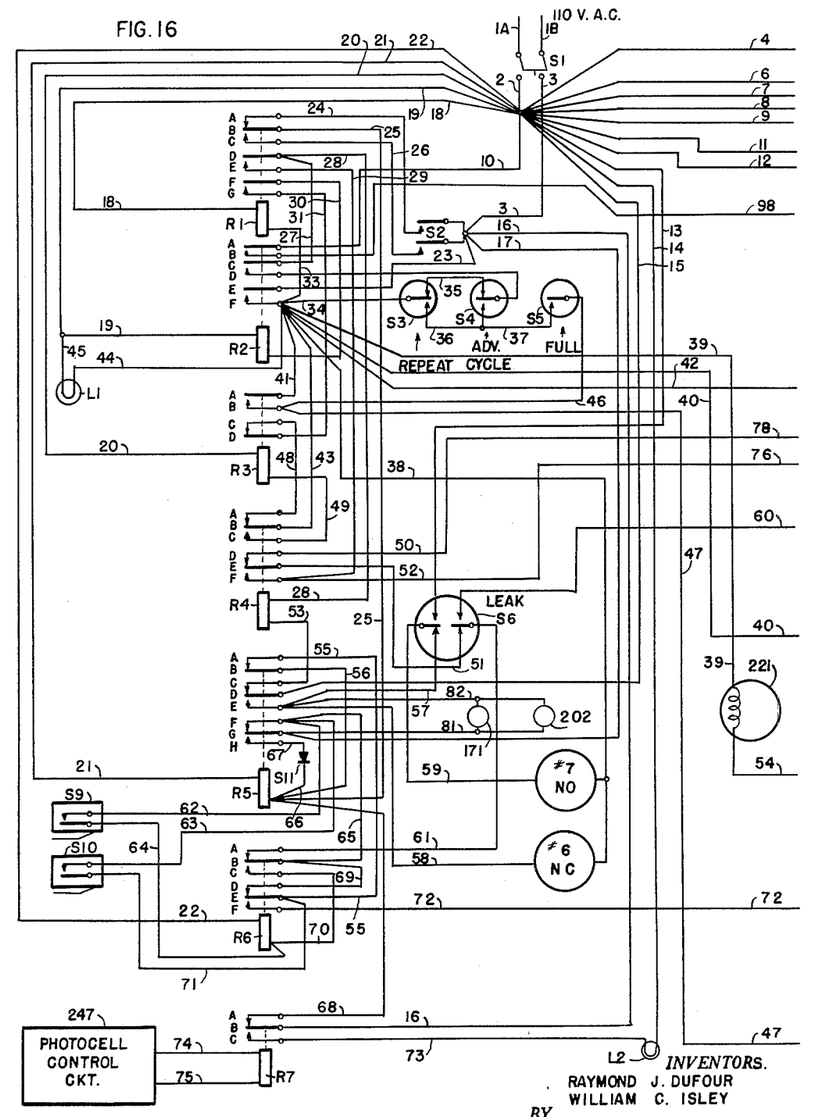
FIGURES 16 and 16A together are a circuit diagram of the automatic prover means of our invention.

In order to initiate proof of a meter, main solenoid valve 1, filling solenoid valve 2 and check rate solenoid valve 9 are opened with the valves 7 and 8 remaining open and valves 3, 5, 6, 11 and 13 remaining closed. Air then flows through pipe sections 231, 232, 233, 235 and 236 into the prover bell B. A leak test is taken by closing push button leak test switch S–6 of FIGURE 16 thereby closing valves 2, 7 and 8. That stops filling of the bell B and air is trapped under pressure in the meter M. A manometer 246 connected to pipe section 241 extending from the outlet of the meter M is then observed to detect any leak which may exist. After the completion of the leak test, assuming no leak to exist, the push button switch S–6 is released and the solenoid valves 2, 7 and 8 again open and filling of the bell B continues. When the bell B has overfilled to the proper extent the solenoid valve 2 closes and valve 5 is opened bleeding air from beneath the bell to atmosphere through pipe section 234 until the bell reaches the proper height indicated on the gauge g for the test run, such as two cubic feet, at which point the valve 5 closes. During filling of the bell B air continues to flow through the meter at a check rate by means of the pipe sections 231, 239, regulator 228, pipe section 238, solenoid valve 7, pipe section 240, the meter M, pipe section 241, solenoid valve 8, pipe section 242, solenoid valve 9, throttling valve 10 and pipe section 245 to an exhaust hood, such air flow continuing after closing of solenoid valves 2 and 5. Accordingly, during the following filling of the bell the prover hand of the meter revolves at a check rate over the prover dial. In that connection it should be noted that the coil of the relay R–7 of FIGURE 16 is connected by leads 74 and 75 to a photocell control circuit 247 including the photocell tube 142. The photocell circuit may be any suitable known circuit, and we have found the photoelectric circuit shown at page 183 of the Handbook of Industrial Electronic Circuits, by John Markus and Vin Zeluff, published by McGraw-Hill Company, Inc., of New York, 1948 edition, to be suitable for our purposes. When the image of the prover hand passes over the photocell tube 142 solenoid valve 6 is opened and valve 7 is closed. Air from under the bell B then passes through the meter M by means of the pipe sections 236 and 237, solenoid valve 6, pipe section 240, the meter M, pipe section 241 and solenoid valve 8, pipe section 242, check rate solenoid valve 9, throttling valve 10 and pipe section 245. During the descent of the bell B a mark is made upon the record or proof card 181 in the manner previously described. That completes the first test run of the proof. Upon completion of that run solenoid valve 6 closes and valve 7 opens, throttled filling solenoid valve 3 also opening to allow air to fill the bell B once more. When solenoid valve 3 opens, check rate solenoid valve 9 closes and speed-up solenoid valve 13 opens, as is explained more fully in connection with the circuit diagram, so that air flows through the meter M at an increased rate in order to speed up the rate of travel of the prover hand and thus reduce delay between test runs. The flow of air through valve 3 may be regulated by the manually operated throttle valve 4 so as to have the prover hand at a desired position when the proving bell B is filled. Air flows into the bell B through the pipe sections 231, 248, 233, 235 and 236 and air passes through the meter M by way of the pipe sections 231 and 239, regulator 228, pipe section 238, solenoid valve 7, pipe section 240, meter M, pipe section 241 and solenoid valve 8, pipe section 242 and speed up solenoid valve 13, pressure regulator 230, orifice 229 and pipe section 245. When the bell B has been overfilled to the predetermined extent, solenoid valves 3 and 13 close and the check rate valve 9 opens so that air then flows through the meter by way of pipe sections 231, 239, regulator 228, pipe section 238, solenoid valve 7, pipe section 240, meter M, pipe section 241 and solenoid valve 8, pipe section 242, solenoid valve 9, throttle valve 10 and pipe section 245 to the exhaust hood. The solenoid valve 5 is then opened and bleeds air from under the bell B until it reaches its proper position, at which time the solenoid valve 5 closes. The image of the prover hand then passes over the photocell tube 142 which causes opening of solenoid valve 6 and closing of the solenoid valve 7. Air from under the bell then passes through the meter by way of pipe sections 236 and 237, solenoid valve 6, pipe section 240, the meter M, pipe section 241 and solenoid valve 8, pipe section 242, check rate solenoid valve 9, throttle valve 10 and pipe section 245 to the exhaust hood. During the descent of the bell a record is made of the test run as before. When the image of the prover hand again passes over the photocell tube 142, which completes the second test run, solenoid valve 6 closes and solenoid valve 7, filling solenoid valve 2 and full rate solenoid valve 11 open. Air now passes through the meter M at an open rate by way of pipe sections 231 and 239, pressure regulator 228, pipe section 238, solenoid valve 7, pipe section 240, meter M, pipe section 241 and solenoid valve 8, pipe sections 242 and 243, solenoid valves 9 and 11, and pipe section 245 to the exhaust hood. Air also flows into the bell B by way of pipe section 231, filling solenoid valve 2, pipe section 232, pipe section 233, pipe section 235 and pipe section 236. When the bell is raised to its overfilled position solenoid valve 2 closes and the bell is bled down to the proper mark of the gauge g by opening of solenoid valve 5, which then closes. When the image of the prover hand passes over the photocell tube 142 valve 7 closes and valve 6 opens. Air then passes through the meter M at an open rate by way of pipe sections 236 and 237, solenoid valve 6, pipe section 240, meter M, pipe section 241, solenoid valve 8, pipe sections 242 and 243, solenoid valves 9 and 11, and pipe section 245 to the exhaust hood. During descent of the bell B the stylus 206 draws a line 269 upon the proof or record card 181, it being noted that the carriage 155 is moved out one step at the start of each test or check run. The image of the prover hand again passes over the photocell tube 142, which completes the third test run and causes the solenoid valves 1, 6, 9 and 11 to close, and valve 7 to open, the apparatus then being conditioned for proving a succeeding meter.

Figure 16A:
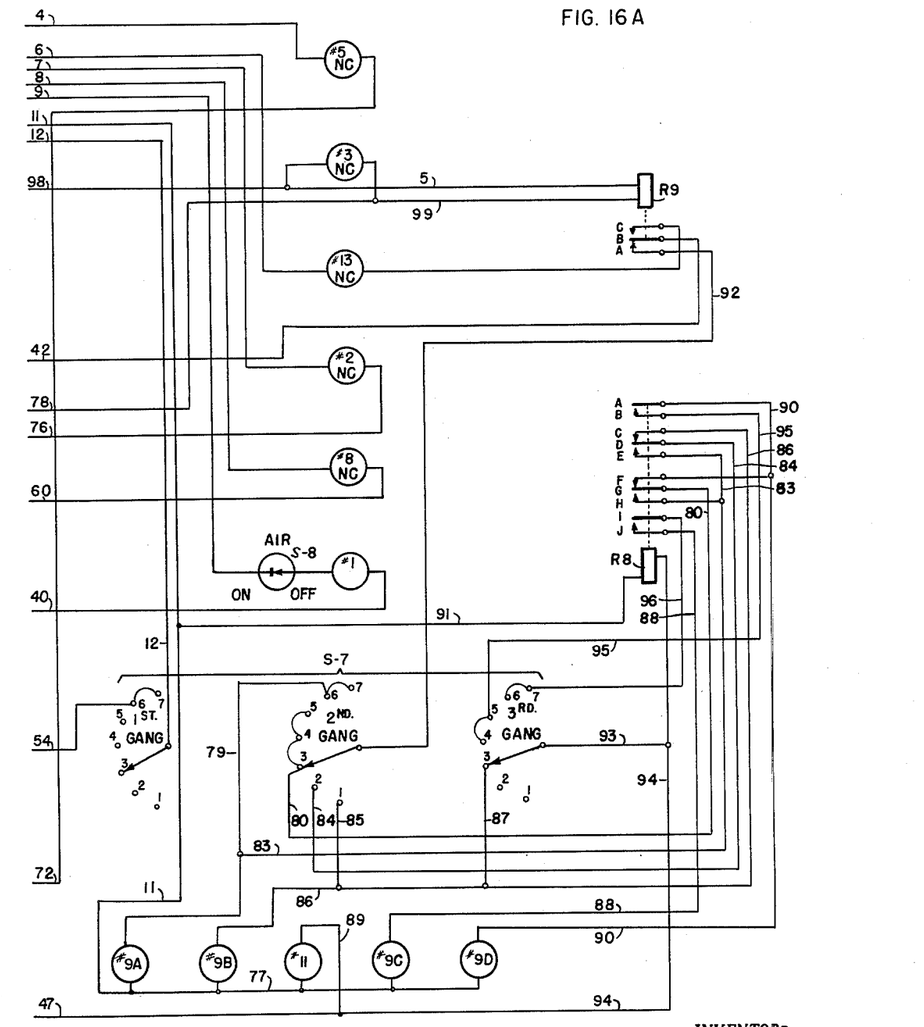

The above description of the operation of the apparatus, in connection with the schematic view of FIGURE 15 will be helpful in connection with the description in respect to the circuit diagram of FIGURES 16 and 16A. The controls, in major portion, are contained in a control box 249 mounted on the meter stand S. In the circuit diagram the relays may be of any suitable known type and are designated by the letter "R" with an attached number, the switches are of suitable known type and are designated by the letter "S" with an attached number, the control solenoid valves are of suitable known type and are designated by the same numbers as in FIGURE 15, and the "rate" solenoid valves are of suitable known type and are designated as "#9" with an attached letter, except the "full rate" solenoid valve, which is designated as "#11." In FIGURE 15 but one rate valve, designated "9" is shown, for simplicity of illustration. The electrical source for operation of this system (preferably 120 volts A.C., 60 cycles) is brought into the control box 249 by means of mains 1-A and 1-B to the master switch (S-1). The meter to be proved is placed on the test stand S in proper relation to the optical system 134, gang switch S-7 is positioned according to the type of meter on test, and air control switch S-8 is turned on. When the master switch S-1 is closed, current flows through leads 3, 16, contacts A-B on R-7, 68, through the coil on R-5, 21 and 2 completing the circuit which energizes the coil on R-5. Current also can flow momentarily by leads 3, 17, contacts F-G on R-5, 65, 69, contacts D-E on R-6, 55, contacts A-B on R-5, 56, through R-5 coil, 21 and 2 completing the circuit. This latter circuit will be subsequently designated as the fill holding circuit. When R-5 coil is energized, contacts A-B, C-D and F-G open and contacts D-E and G-H close on R-5. The opening of contacts A-B on R-5 breaks the fill holding circuit on R-5 coil leaving only the circuit established through contacts A-B on R-7. These contacts maintain current on R-5 coil until the photocell circuit is operative. This means that a small amount of time is required for the tubes in the photocell circuit to "warm up" establishing a current flow. The closing of contacts B-C on R-7 occurs when sufficient light falls upon the exposed photocell. The point at which contacts B-C are made may be varied by means of a sensitivity control which adapts the photocell to changes in light intensity.

When contacts A-B on R-7 break, the circuit energizing R-5 coil is broken leaving R-5 coil de-energized. When the photocell unit is properly adjusted, a minimum current flow through R-7 coil is set up to pull contact B to contact C on R-7. When the condition exists that R-7 is properly adjusted, the equipment is ready for automatic proving of meters. The proper flow rate and quantity of gas to be used for the proof is selected by turning the selector switch (S-7) to the correct meter type.

The start push button (S-2) is pressed and the automatic cycle is initiated. In the adjustment of R-7, the coil of R-5 may be de-energized and contacts G-H, and D-E closed on R-5. Therefore, one purpose of the start button (S-2) is to insure energization of the R-5 coil by the circuit 3, S-2, 24, contacts A-B on R-1, 25, through R-5 coil, 21, and 2, in order that R-5 contacts A-B, F-G are closed. The R-5 coil is now held energized by the fill holding circuit in the necessary position to start the test. Once contacts A-B on R-5 are made, current can flow through R-4 coil by means of the circuit 3, S-2, 26, contacts C-D on R-1, 28, through R-4 coil, 53, contacts C-D on R-5, 15, and 2. When R-4 coil is energized, R-4 contacts B-C and E-F close. R-2 coil now becomes energized by the circuit 3, 17, contacts F-G on R-5, 65, contacts A-B on R-6, 61, closed contacts on S-6, 51, contacts E-F on R-4, 29, contacts E-F on R-1, 30, through coil R-2, 19, and 2. R-2 contacts A-B, C-D, and E-F close, which initiates a number of circuits simultaneously. A circuit is established energizing coil R-3 by means of leads 3, 23, contacts E-F on R-2, 43, contacts B-C on R-4, 49, through coil R-3, 20, and 2. Also coil R-1 is energized by the circuit 3, 23, contacts E-F on R-2, 33, through coil R-1, 18, and 2, breaking contacts A-B and C-D. The filling solenoid (#2) is energized by means of the circuit through 2, 7, through solenoid coil, 76, 52, contacts E-F on R-4, 51, closed contacts on S-6, 61, contacts A-B on R-6, 65, contacts F-G on R-5, 17, and 3. Along with the filling solenoid the master solenoid (#1) is energized by means of the circuit 2, 9, switch S-8, through the solenoid coil, 40, contacts E-F on R-2, 23, and 3; a check rate solenoid, for example #9D, is energized at the same time by the circuit 2, 11, 77, through the solenoid coil of 9D, 90, closed contacts F-G of R-8, 80, closed contacts of second gang of S-7, 92, closed contacts A-B of R-9, closed contacts E-F of R-2, 23, and 3. When check rate valve #9D is energized, the solenoid 221 is not energized, due to the positioning of the first gang of switch S-7, thereby to maintain the lower micro switches S-9L and S-10L in normal position to accommodate filling of the prover bell to the two cubic foot mark. When the coil R-1 is energized, R-1 contacts D-E and F-G close disengaging the start push button (S-2) from the circuits. Due to the above circuits, the master solenoid valve #1, the filling solenoid valve #2, and a check rate solenoid valve #9D have all opened, and air is now passing through the meter under test by means of normally open solenoid valves 7 and 8. Air also fills the prover bell B through solenoid valves 1 and 2. It is during this time that a leak test is taken. The leak test is accomplished by pressing the leak test button switch (S-6) at any time before the prover bell B has leveled in position for the check run. When S-6 is pressed, the normally open prover by-pass solenoid valve (#7) is closed by means of the circuit 3, 23, contacts E-F on R-2, 38, 59, through closed contacts on S-6, 13, and 2. The leak test solenoid valve (#8) is also closed at this time by means of circuit 2, 8, solenoid coil, 60, closed contacts on S-6, 61, contacts A-B on R-6, 65, contacts F-G on R-5, 17, and 3. The previously given circuit energizing the filling solenoid valve (#2) is broken when S-6 is pressed, stopping the filling of the prover bell B. The manometer 246 is observed for a short period of time to check for a leak in the meter case or connections thereto. When the leak test button is released, the above circuits closing solenoid valves 7 and 8 are broken at S–6 contacts, returning them to their normally open position. Also the circuit energizing the filling solenoid valve #2 is once more established and air passes through the meter again and also fills the prover bell B. The arm 207 of member 208, located on the prover bell B rises to the point where it closes S–10 micro switch. This places a parallel closed circuit on R–6 contacts D–E, which results in a holding circuit, designated as the leveling holding circuit, on the R–5 coil by means of leads 3, 17, contacts F–G on R–5, 63, through closed contacts on S–10, 71, 55, through contacts A–B on R–5, 56, through R–5 coil, 21, and 2. This allows for the correct positioning of the prover bell B before any triggering action can occur from R–7. The prover bell B continues to rise after closing S–10L micro switch until the arm 207 closes S–9L micro switch. The two micro switches have been positioned so that the bell has overfilled the desired proof point. When S–9L contacts are closed, R–6 coil becomes energized by means of the circuit 2, 22, through R–6 coil, 64, through closed contacts on S–9, 62, contacts F–G on R–5, 17, and 3, and contacts B–C and E–F close on R–6. The circuit energizing the filling solenoid valve #2 is broken when contacts A–B on R–6 open, closing the filling solenoid valve #2. When contacts E–F on R–6 close, the leveling solenoid valve (#5) is energized by the circuit 2, 4, solenoid coil, 72, contacts E–F on R–6, 71, closed contacts on S–10, 63, closed contacts F–G on R–5, 17 and 3. The leveling holding circuit keeps R–5 coil energized by means of the previously given circuit. Now the prover bell B slowly bleeds down to the proof mark, at which time S–10L micro switch breaks contacts. When this occurs, the circuit energizing the leveling solenoid (#5) is broken stopping the prover bell B. The bell is now in the correct position for proving the meter. Also, when S–10L contacts break, the leveling holding circuit is broken, deenergizing R–5 coil. Any time after the leveling holding circuit has been broken, R–7 contacts A–B, when closed, will energize R–5 coil. R–7 is so placed in the photocell circuit that when contacts B–C on R–7 are closed, there is sufficient light falling upon the exposed photocell tube 142 to energize R–7 coil. R–7 contacts A–B will be closed when the image of the proving hand on the meter under test passes over the exposed photocell tube 142, decreasing the light intensity. This triggering action very accurately positions the proving hand on the meter for each test run. When contacts A–B on R–7 make (which means the proving hand is correctly positioned) R–5 coil is energized, and contacts D–E and G–H on R–5 close. Three simultaneous circuits are established, the first closes the prover by-pass solenoid valve (#7) by the circuit 3, 23, contacts E–F on R–2, 38, through #7 solenoid coil, 59, through closed contacts on S–6, 57, contacts D–E on R–5, 15, and 2. The second opens the prover outlet solenoid valve (#6) by the circuit 3, 23, contacts E–F on R–2, 38, through #6 solenoid coil, 58, contacts D–E on R–5, 15, and 2. The third circuit actuates the proof recorder 148 by way of the conductors 3, 17, 81, through the coils of solenoids 171 and 202 mounted on recorder 148, 82, through closed contacts D–E on R–5, 15, and 2. Also R–4 coil now becomes de-energized because the circuit has been broken at contact C on R–5. R–3 coil is still energized by the circuit 2, 20, through R–3 coil, 49, closed contacts B–C on R–4, 43, closed contacts E–F on R–2, 23, and 3. The meter has now been placed on proof by switching from the by-pass feed through the meter to the accurately measured quantity of air under the prover bell B. This switching action occurs with air at the same pressure conditions and for the same rate of flow, which means that a more accurate proof will be obtained than if the meter were at rest. When R–5 contacts D–E and G–H close, the circuit energizing R–6 coil is broken and contacts A–B and D–E once more close on R–6. While the prover bell B is filled, a mercury switch S–11 attached to the prover pulley p closed contacts. This mercury switch (S–11) is placed so that its contacts close when the prover bell B has filled approximately three-tenths of a cubic foot of air and does not break its contacts until the bell has proved all but approximately three-tenths cubic foot through the meter under test. The exact position of S–11 is not important except that ordinarily it is placed so that it breaks contact when there is less air in bell B than the amount required to affect one complete revolution of the meter prover hand. For example, if a one-half cubic foot dial is used for the test run, the mercury switch must be placed so that its contacts break after the prover bell B has less than one-half cubic foot of air left in it. In this way there is no danger of triggering the circuit before the end of a run. Therefore, when contacts D–E and G–H on R–5 close, the mercury switch (S–11) places a holding circuit on R–5 coil by means of 2, 21, through R–5 coil, 66, through closed contacts on S–11, 67, closed contacts G–H on R–5, 17, and 3. This holding circuit will be referred to as the proof holding circuit. Air passes through the meter under test and continues to pass after S–11 contacts break. When switch S–11 opens R–5 coil becomes de-energized and there is only about three-tenths of a cubic foot of air left under the bell. The proving hand on the meter passes in front of the exposed photocell tube 142 once more and R–7 is de-energized closing contacts A–B on R–7. This establishes the circuit 3, 16, contacts A–B on R–7, 68, through the coil on R–5, 21 and 2, energizing R–5 coil. This completes the first proof.

It is desirable to provide means for quickly positioning the index or prover hand for the succeeding or second check run. At the completion of the first run the position of the prover hand is known, which renders it feasible to include a speed-up cycle to save time. That is accomplished by means of the throttled filling solenoid valve #3 and the speed-up solenoid valve #13, as will appear presently. The energization of R–5 coil closes contacts A–B, C–D and F–G on R–5, which immediately de-energizes the solenoids 171 and 202 mounted on the recorder 148, de-energizes the prover outlet solenoids valve (#6) and the prover by-pass solenoid valve (#7), simultaneously places the fill holding circuit in effect and energizes R–4 coil by the circuit 3, 23, contacts E–F on R–2, 34, closed contacts on S–3, 35, closed contacts on S–4, 32, contacts C–D on R–2, 27, 28, through R–4 coil, 53, contacts C–D on R–5, 15, and 2. Contacts A–B and D–E close on R–4, which energizes the throttled filling solenoid valve #3 by the circuit 2, 10, contacts A–B on R–2, 98, through solenoid coil, 78, 50, contacts D–E on R–4, 51, through closed contacts on S–6, 61, contacts A–B on R–6, 65, contacts F–G on R–5, 17, and 3. The coil of R–9 is energized at the same time by circuit 2, 10, contacts A–B on R–2, 98, 5, through coil R–9, 99, 78, 50, contacts D–E on R–4, 51, closed contacts on S–6, 61, contacts A–B on R–6, 65, contacts F–G on R–5, 17 and 3. This opens the circuit of valve #9D at contacts A and B of R–9 and closes the circuit of speed-up solenoid valve (#13) which is then energized by the circuit 2, 6, solenoid coil, 97, contacts B–C on R–9, 42, contacts E–F on R–2, 23, and 3 completing the circuit. The breaking of contacts B–C on R–4 de-energizes the R–3 coil.

Opening solenoid valves #3 and #13 permits air to flow through the meter at a higher flow rate by means of the open solenoid valves #1, #7, #8 and #13, while air flows into the prover bell by means of the open solenoid valves #1 and #3. The flow rate of air into the prover bell is regulated by the manually operated throttling valve #4, which is so adjusted that the prover hand of the meter will be at the desired position before the rate of flow to the meter is reduced to the check rate. The prover bell rises until the arm 207 closes S–10 micro switch. This once more establishes the leveling holding circuit on the R–5 coil. The bell continues to rise, as it did for the first run, until the arm 207 closes S–9 micro switch. When S–9 contacts close, R–6 coil becomes energized by means of the circuit 2, 22, through R–6 coil, 64, through closed contacts on S–9, 62, contacts F–G on R–5, 17, and 3, and contacts B–C and E–F on R–6 close. The circuit energizing the throttled filling solenoid valve (#3) and coil R–9, is broken when contacts A–B open on R–6, thus to open contacts B–C of R–9 and de-energized the speed-up solenoid valve (#13), whereupon those valves again close. Also contacts A–B of R–9 are closed reopening solenoid valve #9D for flow of air through the meter at the check rate. The leveling solenoid valve (#5) is energized again by the circuit 2, 4, 72, contacts E–F on R–6, 71, closed contacts on S–10, 63, closed contacts F–G on R–5, 17 and 3. The prover bell B bleeds down to the proof point where S–10 contacts barely break. When this occurs, the circuits energizing the leveling solenoid valve (#5) and the leveling holding circuit are both broken. The bell is now in the correct position for the second run. When the image of the proving hand on the meter again passes in front of the exposed photocell tube 142, R–7 coil becomes de-energized and contacts A–B close. R–5 coil becomes energized by the circuit 3, 16, contacts A–B on R–7, 68, through R–5 coil, 21, and 2, and contacts D–E and G–H close on R–5. The opening of R–5 contacts C–D de-energizes R–4 coil. The remainder of the second run is identical with the first. As in the first run, the proof holding circuit keeps R–5 coil energized until the bell has passed all but approximately three-tenths cubic feet of the air through the meter.

At the completion of the second run, the R–5 coil becomes energized by the circuit previously given through R–7 contacts. Contacts A–B, C–D, and F–G close on R–5. This sets up a number of simultaneous circuits. R–4 coil is energized by 3, 23, contacts E–F on R–2, 34, S–3, 35, S–4, 32, contacts C–D on R–2, 27, 28, through R–4 coil, 53, contacts C–D on R–5, 15, and 2. R–4 contacts B–C and E–F close. When R–5 shifted contacts, solenoid valves #6 and #7 were de-energized as in the first run. R–3 coil is energized by the circuit 2, 20, through R–3 coil, 49, closed contacts B–C on R–4, 43, closed contacts E–F on R–2, 23, and 3. Filling solenoid valve (#2) is once more energized by the circuit 2, 7, through solenoid coil, 76, 52, closed contacts E–F on R–4, 51, closed contacts on S–6, 61, closed contacts A–B on R–6, 65, closed contacts F–G on R–5, 17, and 3. When R–3 coil is energized, R–3 contacts A–B close, which opens full rate solenoid valve #11 by means of the circuit 3, 23, closed contacts E–F on R–2, 41, closed contacts A–B on R–3, 47, 89, through full rate solenoid valve #11, 77, 11, and 2. At this point air is passing through the meter at a different and greater flow rate than in the first and second runs, while air fills the prover bell B through solenoid valves #1 and #2. The fill, leveling, and third run cycle is the same as for the first and second runs, except that the flow rate is different in this case due to opening of one or more additional rate solenoid valves, as will be explained more fully later. When the meter is placed on the third or full rate run, R–5 contacts D–E and G–H close. That de-energizes R–4 coil by breaking contacts C–D on R–5. R–3 coil, however, is held energized during the third run by the circuit 2, 20, through R–3 coil, 49, closed contacts B–C on R–4, 43, closed contacts E–F on R–2, 23, and 3; and R–3 contacts A–B and C–D are closed. At the end of the third run the R–7 coil is once more de-energized by the image of the index hand passing over the photocell tube 142. The circuit through R–7 contacts A–B energizes R–5 coil. Contacts A–B, C–D, F–G close on R–5, energizing R–4 coil. R–4 contacts A–B and D–E close, de-energizing R–3 coil and completing a circuit energizing R–2 coil by means of 2, 19, through R–2 coil, 30, through contacts F–G on R–1, 31, through contacts C–D on R–3, 48, contacts A–B on R–4, 43, through contacts E–F on R–2, 23 and 3. Contacts A–B, C–D, and E–F on R–2 open, closing the master solenoid valve (#1), the check rate solenoid valve (#9), and the full rate solenoid valve (#11). Also, R–1 coil is now de-energized and R–1 contacts A–B, C–D, and F–G close. The breaking of R–2 contacts A–B, C–D, and E–F de-energizes R–3 coil and R–4 coil. R–5 coil remains energized by the fill holding circuit. The equipment is now ready for the next meter to be tested. A following automatic run can be initiated by pressing the start push button switch (S–2) after the meter has been properly adjusted on the stand. After any automatic cycle, all relays and solenoids assume their normal positions indicated in FIGURES 16 and 16A. It should be noted that R–5 coil remains energized after each meter has been proved. When the start push button (S–2) is pressed without having opened master switch S–1 after completion of proof of a meter, relay R–5 remains in position for filling. Therefore, any subsequent runs will be the same as given above with the exception that the R–5 contacts will be held in fill position by the fill holding circuit and need not be moved to that position in the manner previously described unless the main switch S–1 has been opened after completion of proof of a meter.

Herein, our apparatus is described as applied particularly to the proof of meters in accordance with the requirements of the State of Illinois which specify two check rate runs at approximately 20% of full rate and one full rate run. It is for this reason that the embodiment shown and described involves two check rate runs and one full rate run. Variations in the sequence and number of operations or test runs may, of course, be made to meet the requirements of any given locality.

In addition, it is to be noted that there are various types of meters, those most frequently used being known as the "150—5 light," "175—5 light," "210—5 light," "225 (240)—5 light" and "275 (300)—10 light." In the above designations, the first number indicates cubic feet per hour of gas passed through the meter at full rate, and accordingly, the cubic feet per hour of air that should be passed through the meter during the third or full rate test run provided according to the apparatus of the present invention. During the first and second test runs of a meter, gas or air should pass through the meter at a predetermined rate established for that meter, in the specific requirements set forth above, approximately 20% of full rate. By way of example, in proving a "210—5 light" meter, air should be passed through the meter at a check rate of 42 c.f.h. in each of the first and second test runs, and at a rate of 210 c.f.h. in the third or full rate run. In the above designations, the second number refers to the number of "lights" or indicator hands and scales provided on the meter for indicating the amount of gas passing therethrough.

In view of the number and character of meters to be tested, and the tests to which the same are to be subjected in the specific embodiment, we have adopted check rate solenoid valves #9 and a "full rate" solenoid valve #11 regulating the flow of gas therethrough to specific quantities, namely, a valve #9A passing 60 c.f.h., a valve #9B passing 30 c.f.h., a valve #9C passing 95 c.f.h., a valve #9D passing 42 c.f.h. and a valve #11 passing 120 c.f.h. In proving the various types of meters, these valves are employed in the manner set forth below.

The solenoid valves #9A, 9B, 9C, 9D and 11, and the solenoid 221 are controlled by means of the gang switch S–7 which switch comprises three gangs, each having seven contact points. The purpose of the gang switch is to accommodate setting of the apparatus for automatic testing of the various types of meters in accordance with the preceding description, suitable indicia being provided on the switch to indicate the settings thereof for testing the seven stated types of meters. Specifically, when the gang switch is positioned as shown in FIGURE 16A, with the switch blade in engagement with the third contact in each gang, the apparatus of the invention is set automatically to prove a "210—5 light" meter. As previously pointed out, in the two check rate runs, the solenoid valve #9D is energized to accommodate passage of air through the meter at the proper check rate of 42 c.f.h.

With the selector gang switch S–7 adjusted as shown in the circuit diagram, the full rate solenoid valve #11 is opened at the start of the third run as above described. The check rate solenoid valve #9B is also open due to energizing of the coil thereof by way of circuit 2, 11, 77, the coil of #9B, 86, 87, the closed contacts of the third gang of S–7, 93, 94, 47, closed contacts A–B of R–3, 41, closed contacts E–F of R–2, 23 and 3. Also, relay R–8 is energized by way of the circuit 2, 11, 91, the coil of R–8, 94, 47, closed contacts A–B of R–3, 41, closed contacts E–F of R–2, 23 and 2, closing contacts A–B, D–E, G–H, and I–J of R–8. That causes opening of the solenoid valve #9A by way of the circuit 2, 11, 77, coil of #9A, 83, closed contacts G–H of R–8, 80, closed contacts on second gang of S–7, 92, closed contacts A–B of R–9, 42, closed contacts E–F of R–2, 23 and 3. The solenoid valves #9A, #9B and #11 are now open, and the solenoid valves #9C and #9D are closed, so that the meter under test now passes air at the proper open rate of 210 c.f.h. Upon completion of the third run of a test or proof, the solenoids of all of the solenoid valves are de-energized and they are then in their normal positions indicated in the circuit diagram.

In order to prove a 150—5 light meter, the gang switch S–7 is adjusted so that the blades thereof contact the first contact elements of the three gangs respectively. With that adjustment of S–7, the coil of the solenoid test rate valve #9B is energized by way of the circuit 2, 11, 77, the coil of #9B, 86, 85, the closed contacts of the second gang of S–7, 92, closed contacts A–B of R–9, 42, closed contacts E–F of R–2, 23 and 3. The first and the second runs are then made in the manner previously described, with the solenoid valve #9B open, which gives the proper check flow rate of 30 c.f.h. for that meter. Upon completion of the first and second test runs, with S–7 remaining in its set position, the coil of the full rate solenoid valve #11 is energized by way of the circuit 2, 11, 77, coil of #11, 89, 47, closed contacts A–B of R–3, 41, closed contacts E–F of R–2, 23 and 3. The solenoid valves #9B and #11 are now open and air passes through the meter at the appropriate full rate of 150 c.f.h.

To prove a 175—5 light meter, the gang switch S–7 is set on the second contacts and the coil of the check rate solenoid valve #9B is then energized at the time of the two check rate runs by way of the circuit 2, 11, 77, coil of #9B, 86, closed contacts C–D of R–8, 84, closed contacts of second gang of S–7, 92, closed contacts A–B of R–9, 42, closed contacts E–F of R–2, 23 and 3. The check rate valve #9B is thus open for the first and second runs, giving an acceptable check rate flow of 30 c.f.h. for that meter. Upon completion of the first and second runs, the coil of the full rate solenoid valve #11 is energized by way of the same circuit as is traced above in respect to the 150—5 light meter, and that valve remains open during the third run. At the same time, due to energization of R–8, solenoid valve #9B is de-energized, and the coil of the #9A solenoid valve is energized by way of the circuit 2, 11, 77, coil of #9A, 83, closed contacts D–E of R–8, 84, closed contacts of the second gang of S–7, 92, closed contacts A–B of R–9, 42, closed contacts E–F of R–2, 23 and 3. The solenoid valves #9A and #11 are now both open and remain open during the third run, and air flows through the meter at a full rate of 180 c.f.h., which is acceptable for that meter.

To make the first two runs of a 225 (240)—5 light meter, the gang switch S–7 is set on either the fourth or fifth contacts thereof. In either case the proof is the same, but the switch S–7 may conveniently be set in its fourth position when testing a 225—5 meter and in its fifth position for testing of a 240—5 meter. In either position of S–7, the coil of the check rate solenoid valve #9D is energized by way of the circuit 2, 11, 77, coil of #9D, 90, closed contacts of second gang of S–7, 92, closed contacts A–B of R–9, 42, closed contacts E–F of R–2, 23 and 3. That opens solenoid valve #9D for the first and second runs, which provides an appropriate check rate of 42 c.f.h. for the meters. In making the third run, the coil of the full rate solenoid valve #11 is energized by way of the same circuit as for the 150—5 light meter, thus energizing R–8. The coil of the check rate solenoid valve #9A is then energized by way of the circuit 2, 11, 77, coil of #9A, 83, closed contacts G–H of R–8, 80, closed contacts of the second gang of S–7, 92, closed contacts A–B of R–9, 42, closed contacts E–F of R–2, 23 and 3. Also, the coil of check rate solenoid valve #9D is energized by way of the circuit 2, 11, 77, coil of #9D, 90, closed contacts A–B of R–8, 95, closed contacts of the third gang of S–7, 93, 94, 47, closed contacts A–B of R–3, 41, closed contacts E–F of R–2, 23 and 3. The solenoid valves #11, #9A and #9D are then open and air flows through the meter at the full flow rate of 222 c.f.h., which is acceptable for 225 (240)—5 meters.

In proving a 275 (300)—10 light meter, the selector gang switch is set with the blades thereof on either the sixth or seventh contact elements of the gangs respectively. In either position, the test is the same, but the sixth position of S–7 may be indicated as the setting for 275—10 meters, while the seventh position may be indicated as the setting for 300—10 meters. During the first two runs, the coil of the #9A solenoid valve is energized by way of the circuit 2, 11, 77, coil of #9A, 79, closed contacts on second gang of S–7, 92, closed contacts A–B of R–9, 42, closed contacts E–F of R–2, 23 and 3. The check rate solenoid valve #9A is then open and air flows through the meter at the check rate of 60 c.f.h., an appropriate rate for the meters. In making the third run, the coil of the full rate solenoid valve #11 and the relay R–8 are energized by the same circuit as for the 150—5 light meter, and valve #11 opens. The coil of check rate solenoid valve #9A remains energized by way of the circuit above described. In addition, the coil of the check rate solenoid valve #9C is energized by way of the circuit 2, 11, 77, coil of #9A, 79, closed contacts on second gang of S–7, 92, closed contacts A–B of R–9, 42, closed contacts E–F of R–2, 23 and 3. The check rate solenoid valve #9A is then open and air flows through the meter at the check rate of 60 c.f.h., an appropriate rate for the meters. In making the third run, the coil of the full rate solenoid valve #11 and the relay R–8 are energized by the same circuit as for the 150—5 light meter, and valve #11 opens. The coil of check rate solenoid valve #9A remains energized by way of the circuit above described. In addition, the coil of the check rate solenoid valve #9C is energized by way of the circuit 2, 11, 77, coil of #9C, 88, closed contacts I–J of R–8, 96, closed contacts of third gang of S–7, 93, 94, 47, closed contacts A–B of R–3, 41, closed contacts E–F of R–2, 23 and 3. The valves #11, #9C and #9A are thus all open and air passes through the meter at a rate of 275 c.f.h., which is the proper rate for a 275—10 meter and an acceptable rate for a 300—10 meter.

In addition to the foregoing, it is to be observed that the types of meters to be proved in the first five positions of the switch S–7 are normally proved by passing approximately two cubic feet of air through the meter, these meter types being provided with a prover hand which makes either one complete revolution or several complete revolutions when correctly indicating passage of two cubic feet of air or gas therethrough. Accordingly, for these meters, the lower set of switches S–9 and S–10 should be disposed in the path of movement of the arm 207 of the member 208 secured to the prover bell. With the apparatus shown, the solenoid 221 should not be energized during the testing of these types of meters, thus to retain the lower switches S–9 and S–10 in their normal operative position. To accomplish this objective, the first five contacts on the first gang of switch S–7 are open or dead points, and only the 6th and 7th contacts are connected to the coil of solenoid 221. Accordingly, the solenoid 221 is not energized when the first five types of meters are properly tested. However, in the case of the last type, or last two types, of meters, namely, 275 (300)—10 light meters, approximately five cubic feet of air is required for each test run. To provide this quantity of air, the gang switch S–7 is disposed with the blades thereof on either the 6th or 7th contact elements of the respective gangs to close a circuit to the coil of solenoid 221 through the first gang of the switch by way of 2, 12, closed contacts on the first gang of S–7, 54, the coil of solenoid 221, 39, closed contacts E–F on R–2, 23 and 3. Upon energization of the solenoid 221, the lower set of switches S–9 and S–10 is moved to inoperative position, and during the filling cycle, the prover bell is filled to the extent determined by the upper set of switches S–9 and S–10, thus to provide slightly more than five cubic feet of air within the bell as previously pointed out. In other respects, automatic operation of the apparatus is the same as that previously described. Thus, it is seen that the gang switch S–7 provides means whereby the flow rate solenoid valves may be selectively combined to give the required test rate and full rate flows for the respective meters, whereby selection of the proper amount of air for the respective tests is automatically made, and whereby the complete apparatus is conveniently conditioned for complete automatic testing of a given meter.

If during the testing of a given meter, it is desired to repeat or omit either a check rate run or a full rate run, it is only necessary to actuate the appropriate one or ones of the switches S–3, S–4 and S–5. For example, to repeat a check rate run, the switch S–5, which is suitably a toggle switch, is positioned in its check rate position, wherein it is open, and the repeat switch S–3, also a toggle switch, is disposed in repeat position, thus to open the normally closed circuit 34, S–3, S–4 and 32, whereupon the cycling of the apparatus does not advance and the check rate test run is repeated. To repeat a full rate run, the switch S–5 is disposed in its full rate position, and the switch S–3 is moved to repeat position, thus to energize the circuit of the full rate solenoid valve #11 by way of the circuit 34, S–3, 36, 37, S–5, 46, 47 and so on. With the switch S–3 in its repeat position, the apparatus will afford continuous check rate runs or continuous full rate runs, depending upon the position of switch S–5. On the other hand, if it is desired to advance the cycling of the machine, it is only necessary to actuate the switch S–4 momentarily one or more times depending upon the number of cycles desired to be omitted. Preferably, the switch S–4 is a push button switch to facilitate momentary actuation thereof. When the switch S–4 is depressed and released, the circuit through 34, S–3, 35, S–4 and 32 is momentarily broken and then remade, thereby imparting a pulse to the appropriate relay coils to cause the relays and circuit to assume the position appropriate for the next succeeding cycle. Each time the push button switch S–4 is depressed, a pulse is imparted to the relay coils, thereby to advance the sequence of operation one step.

Referring further to the circuit diagram of FIGURES 16 and 16A, the mercury switch S–11 is mounted upon the pulley p of the prover P and its function is to place a holding circuit upon relay R–5 to prevent triggering of the control system by relay R–7 until the desired time. That makes it feasible to prove meters having a one-half cubic foot proving dial of which there are many in use. Assume, for example, that a 5 light 150 meter is to be proved. That designation indicates that the rated capacity of the meter is 150 cubic feet per hour. The requirement is that the meter be proved at 20% of its rated capacity, which in this case means that air must be passed through the meter at a flow rate of 30 cubic feet per hour. Further, certain of such meters have a two cubic foot prover dial while others have a one-half foot prover dial. In the latter case the mercury switch S–11 is so positioned on the balance wheel of the prover that it will provide a holding circuit for the relay R–5 during the first three complete revolutions of the prover hand of the one-half cubic foot dial. Accordingly, after completion of the third revolution of the prover hand the mercury switch S–11 opens and upon completion of the fourth revolution of the prover hand the check run is completed as previously described. The apparatus of our invention is thus adapted for proving meters having a prover hand which makes one complete revolution during passage through the meter of two or five cubic feet of air as well as meters having prover hands which make several complete revolutions during passage of two or five cubic feet of air through the meter.

The light L–1 of the circuit diagram shown in FIGURES 16 and 16A is, in practice, disposed in back of a green lens and is illuminated throughout the complete proof of a meter. Accordingly, this light provides a signal indicating that a meter is on proof and that the apparatus should not be tampered with until the proof under way has been completed. The light L–2 of the circuit diagram is, in practice, positioned in back of a red lens and is to indicate the sensitivity of adjustment of the photocell control circuit. In adjusting the equipment for the start of proof of a meter, air is passed through the meter until the prover hand thereof has been turned to a position to clear the photocell tube 142. The photocell control circuit is then adjusted by known means until the light L–2 is illuminated, which indicates that the photocell control circuit is properly adjusted to energize the coil of the relay R–7 and close the contacts B–C thereof. The equipment is then conditioned for proving a meter which is thereafter proved in the manner above described.

It will be understood that changes in detail may be restorted to without departing from the field and scope of our invention, and we intend to include all such variations, as fall within the scope of the appended claim, in this application in which the preferred form only of our invention has been disclosed.

We claim:

In meter proving means of the type wherein a predetermined quantity of fluid under pressure is delivered from a source of supply to a movable prover bell and part of this fluid is subsequently delivered from the bell through a meter during one or more complete cycles of movement of the prover instrumentality of the meter and the accuracy of the meter is determined by measuring the extent of movement of the bell during a predtermined number of cycles of movement of said instrumentality, the improvement comprising in combination, means for sensing each movement of the prover instrumentality past a given point in its path of movement, an electric control circuit operatively associated with said sensing means, said sensing means triggering said circuit upon movement therepast of the prover instrumentality, first conduit means for supplying fluid under pressure from the source to the meter, second conduit means for supplynig fluid under pressure from the bell to the meter, third conduit means for supplying fluid under pressure from the source to the bell, a first electrically operated valve in said first conduit means, a second electrically operated valve in said second conduit means, a third electrically operated valve in said third conduit means, said first valve being normally open for normally causing fluid under pressure to be supplied from the source to the meter, said second and third valves being normally closed, first means in said circuit connected to the operating means of said third valve and responsive to the position of the bell for energizing the operating means of said third valve when the bell is depleted of fluid and for de-energizing said third valve when the bell is filled to a predetermined extent with fluid, second means in said circuit connected to the operating means of said first and second valves and triggered by said sensing means upon an initial passage of the prover instrumentality past said sensing means for substantially simultaneously energizing the operating means of said first and second valves for closing said first valve and opening said second valve thereby to cause a meter proof to be commenced when the meter is under pressure and in operation, said second means being triggered by said sensing means upon a subsequent passage of the prover instrumentality past said sensing means for substantially simultaneously deenergizing the operating means of said first and second valves for opening said first valve and closing said second valve thereby to complete a first proof, third means in said circuit for correlating said first and second means and causing said first and second means to duplicate in sequence their respective functions thereby to repeat the meter proof, fourth electrically operated valve means associated with at least said second conduit means and the meter and having orifices of different sizes for controlling the rate of flow of fluid from the bell through the meter, fourth means in said circuit connected to the operating means of said fourth valve and associated with said third means for varying the rate of flow of fluid through the meter during successive proofs, graphic record means associated with the bell including a record card and a recording stylus operatively associated with the bell to be moved thereby during at least the terminal part of the meter proving movement of the bell, and fifth means in said circuit associated with said first and second means and said recording stylus for shifting said stylus relative to said record card at the commencement of each proof.

References Cited in the file of this patent
UNITED STATES PATENTS

| | | |
|---|---|---|
| 1,422,089 | Dezendorf | July 11, 1922 |
| 1,991,310 | Baas | Feb. 12, 1935 |
| 2,112,504 | Mirfield | Mar. 29, 1938 |
| 2,135,061 | Wagner et al. | Nov. 1, 1938 |
| 2,414,582 | Crosby et al. | Jan. 21, 1947 |
| 2,448,616 | Oakley et al. | Sept. 7, 1948 |
| 2,472,019 | Kinderman | May 31, 1949 |
| 2,510,327 | Bennett | June 6, 1950 |
| 2,640,349 | Gibbs | June 2, 1953 |
| 2,723,589 | Bullock et al. | Nov. 15, 1955 |
| 2,857,798 | Seliger | Oct. 28, 1958 |
| 2,931,216 | Rauth | Apr. 5, 1960 |